June 15, 1965 D. G. BRAITHWAITE ETAL 3,189,534
CELL FOR CARRYING OUT ELECTROCHEMICAL REACTIONS
Filed Dec. 7, 1960 3 Sheets-Sheet 2

INVENTORS:
DAVID G. BRAITHWAITE
WILLIAM HANZEL
BY Merriam, Johnston,
Cook & Root
ATTORNEYS June 15, 1965    D. G. BRAITHWAITE ETAL    3,189,534
CELL FOR CARRYING OUT ELECTROCHEMICAL REACTIONS
Filed Dec. 7, 1960      3 Sheets-Sheet 3
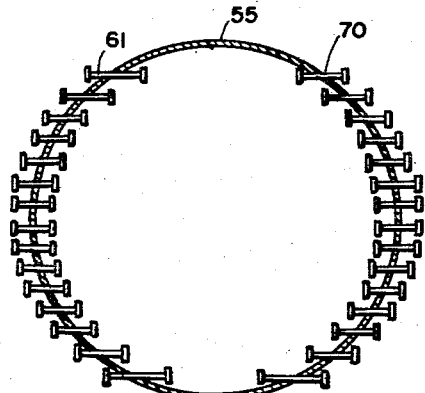
FIG. 7
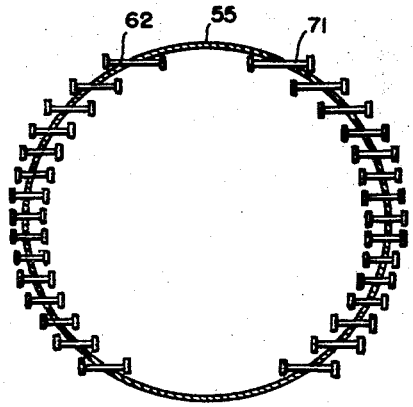
FIG. 8
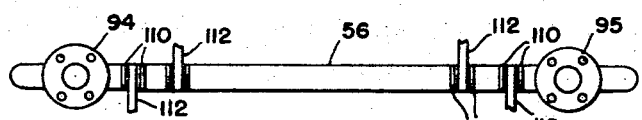
FIG. 9
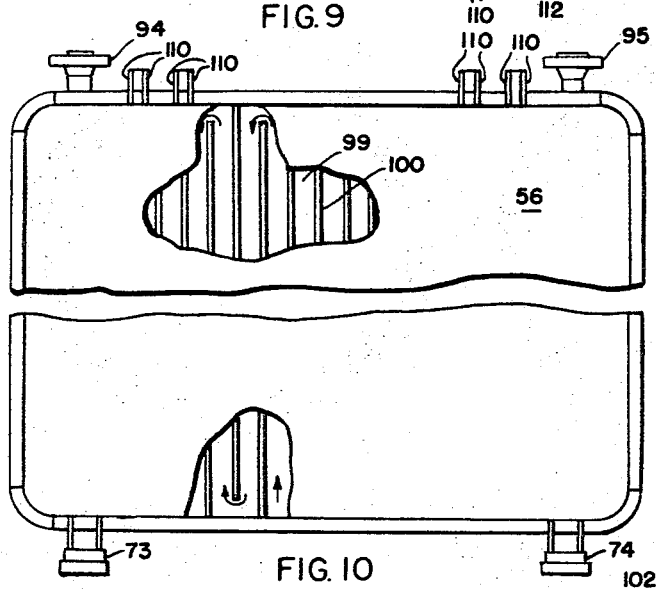
FIG. 10
FIG. 11
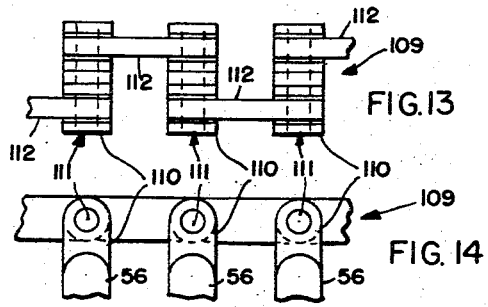
FIG. 13
FIG. 14
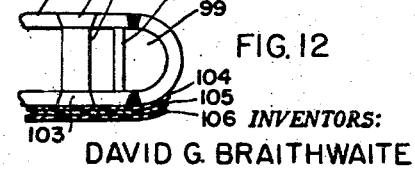
FIG. 12
INVENTORS:
DAVID G. BRAITHWAITE
WILLIAM HANZEL
BY *Marzall Johnston*
*Cook & Root*
ATTORNEYS

United States Patent Office 3,189,534
Patented June 15, 1965

---

3,189,534
CELL FOR CARRYING OUT ELECTROCHEMICAL REACTIONS
David G. Braithwaite and William Hanzel, Chicago, Ill., assignors to Nalco Chemical Company, Chicago, Ill., a corporation of Delaware
Filed Dec. 7, 1960, Ser. No. 74,360
1 Claim. (Cl. 204—274)

This invention relates to a new and improved cell or reaction unit for carrying out reactions, and more particularly to an electrolytic cell for carrying out electrochemical reactions in which one of the reactant substances is a solid electrically conducting substance. The invention is especially useful for the manufacture of tetraethyl lead, tetramethyl lead and other organo metallic compounds.

One of the objects of the invention is to provide a new and improved cell for making chemical compounds.

Another object of the invention is to provide a new type of structure for cells for carrying out electrochemical reactions.

A further object of the invention is to provide a new and improved electrolytic cell for making organo metallic compounds wherein the cell is closed during its operation and additional quantities of the reactant materials are added to the cell continuously or intermittently without permitting significant amounts of the vapors present in the cell to escape to the atmosphere.

Still another object of the invention is to provide an electrolytic cell of the type described in which the temperature within the cell is carefully controlled due to the manner in which the cell is constructed and operated.

A still further object of the invention is to provide a new and improved cell suitable for the manufacture of tetraethyl lead, tetramethyl lead and similar compounds on a commercial scale.

Other objects and advantages of the invention will appear from the following description in conjunction with the accompanying drawings in which, FIG. 1 is a diagrammatic view illustrating one embodiment of the invention suitable for the manufacture of organic lead compounds, such as tetraethyl lead and tetramethyl lead;

FIG. 7 is a plan view taken along the line 7—7 of FIG. 2 illustrating the manner in which conduits or pipes pass through the outer shell of the cell for connection with cathode units inside the cell;

FIG. 8 is a plan view taken along the line 8—8 of FIG. 2 illustrating the positions of the pipes or conduits which pass through the outer shell of the cell and are connected to cathode units within the cell;

FIG. 9 is a plan view of one of the cathode units mounted within the cell;

FIG. 10 is a side elevational view with parts broken away illustrating the cathode unit of FIG. 9;

FIG. 11 is an end view of the cathode unit in FIGS. 9 and 10;

FIG. 12 is an enlarged detail of a portion of the cathode units shown in FIGS. 9, 10 and 11 illustrating the manner in which the cathode unit is insulated and also showing a part of the baffle arrangements disposed in each cathode unit to act as guide means for a heat exchange fluid circulated in such unit;

FIG. 13 is a plan view illustrating a portion of the mounting means for holding the upper parts of the cathode units in position; and FIG. 14 is an elevational view of the mounting means shown in FIG. 13.

Generally stated, the invention comprises a reaction unit or cell for carrying out reactions, more particularly electrochemical reactions, in which there is a container adapted to hold a body of reaction liquid, a hollow element and preferably a plurality of hollow elements positioned in said container, said element being electrically conducting at least on its exterior surface, being impermeable to said reaction liquid and the space within said element being enclosed except for means to introduce and withdraw a heat exchange fluid, means to introduce a heat exchange fluid into said space in said hollow element (or into each of said hollow elements where a plurality are used), means to withdraw a heat exchange fluid from said space in said hollow element (or from each of said hollow elements where more than one is used), means providing a reaction space exteriorly of said hollow element in said container (or a plurality of such reaction spaces) adapted to receive a solid electrically conducting reactant substance (such as, for example, lead pellets where the cell is used to make organic lead compounds), electrical insulating means chemically inert to the reactants and products of reaction adapted to space and to electrically insulate said hollow element (or each said hollow element if more than one is used) from the direct flow of electricity between said hollow element and said reactant substance but permitting the flow of a reaction liquid from said reactant substance to the exterior surface of said hollow element, means to introduce said reaction liquid into said reaction space, means to withdraw said reaction liquid and products of reaction from said reaction space, means to introduce said reactant substance (e.g., lead pellets) into said reaction space, and means to maintain a positive electrical potential on said reactant substance with respect to said electrically conducting exterior surface of said hollow element (or plurality of hollow elements).

Figure 1:
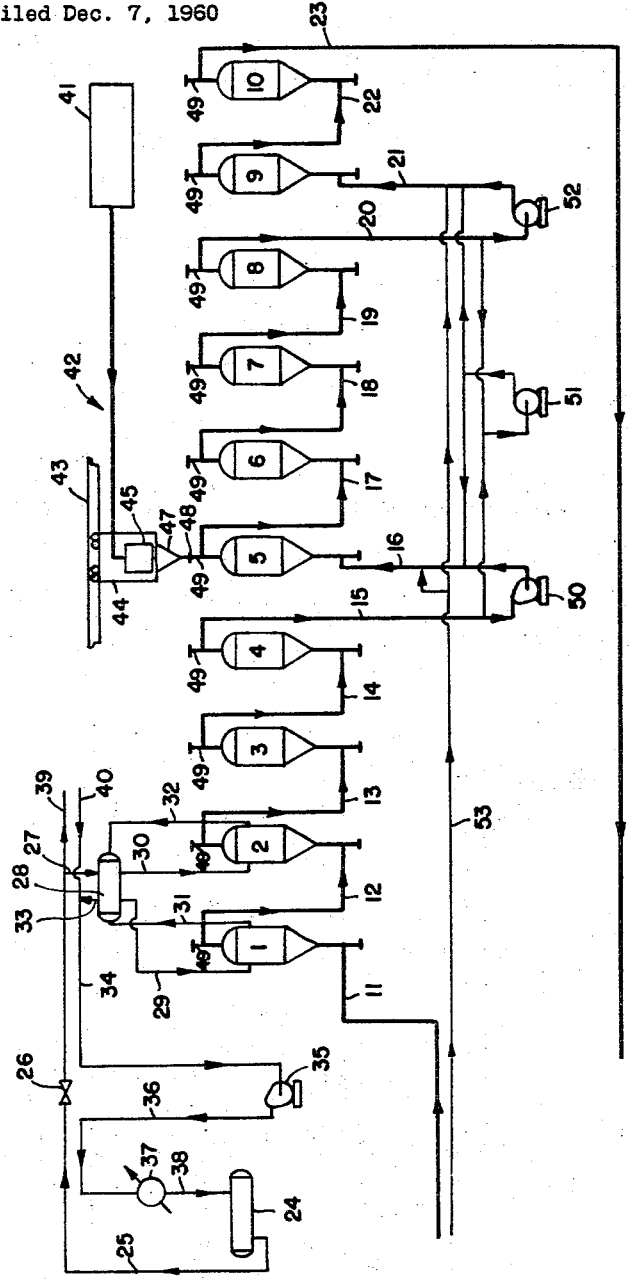

Referring to the drawings, FIG. 1 illustrates diagrammatically a plant layout for manufacturing organo metallic compounds, such as, for example, tetraethyl lead and tetramethyl lead, wherein a number of cells or reaction units of the type herein described are employed. In the particular embodiment shown in the drawing ten cells are used but it will be understood that the number may be greater or less. As shown in FIG. 1, the cells 1, 2, 3, 4, 5, 6, 7, 8, 9, 10 are connected to pipes or conduits 11, 12, 13, 14, 15, 16, 17, 18, 19, 20, 21, 22 and 23. A reaction liquid or electrolyte is circulated through the cells in series. From time to time the electrolyte or reaction liquid passing through conduit 23 is treated to remove the desired reaction products in any suitable manner, not shown, for example, by steam distillation, vacuum distillation or other means, and is then recirculated to the cells through line 11.

A temperature regulation system is provided for each cell but in the drawing is only shown with respect to cells 1 and 2. In this system a heat exchange fluid is stored in an accumulator 24 from which it passes through a conduit 25, an expansion valve 26, conduit 27, surge drum 28, and conduits 29 and 30 to cells 1 and 2, respectively. Where the reaction is exothermic a cooling fluid is used and where the reaction is endothermic a heating unit is used. The particular illustration in the drawing is for a cooling fluid.

The cooling fluid, after passing through the cells 1 and 2, is returned through conduits 31 and 32, respectively, via surge drum 28 and conduit 33 to conduit 34 from which it is compressed by means of compressor 35 and then passed through conduit 36 to condenser 37 where water can be removed, if necessary. From condenser 37 the refrigerant fluid passes through conduit 38 to accumulator 24 and is recycled in the manner previously explained to the cells 1 and 2. In a similar manner, the conduits by means of extensions 39 and 40 are connected to the remaining cells.

Each of the cells is charged with a solid electrically conducting reactant substance. Where organic lead compounds are being manufactured it is preferable to employ as said reactant substance lead pellets or other particulate form of lead which are contained in a storage chamber 41. The pellets are transferred from the storage chamber 41 by means of a suitable conveyor system generally illustrated at 42 and consisting of a rail 43 adapted to carry a wheeled vehicle 44 provided with a carrier container 45 for the pellets and from which the pellets are discharged into a funnel 47. As the lead pellets are used up in the reaction a valve 48 is opened permitting them to pass through line 49 into the cell 5. While this method of loading the cells or replenishing the supply of solid reactant substance in the cells is illustrated only with respect to cell 5, it will be understood that the same procedure is employed with respect to all of the other cells.

Booster pumps 50, 51 and 52 are provided to assist in the circulation of the electrolyte from one cell to another or from one group of cells to another group of cells. A fresh electrolyte is introduced into the system through a conduit 53 connected to a suitable source of supply, not shown. It will be understood that valves are provided in all of the conduits where necessary.

Figure 2:
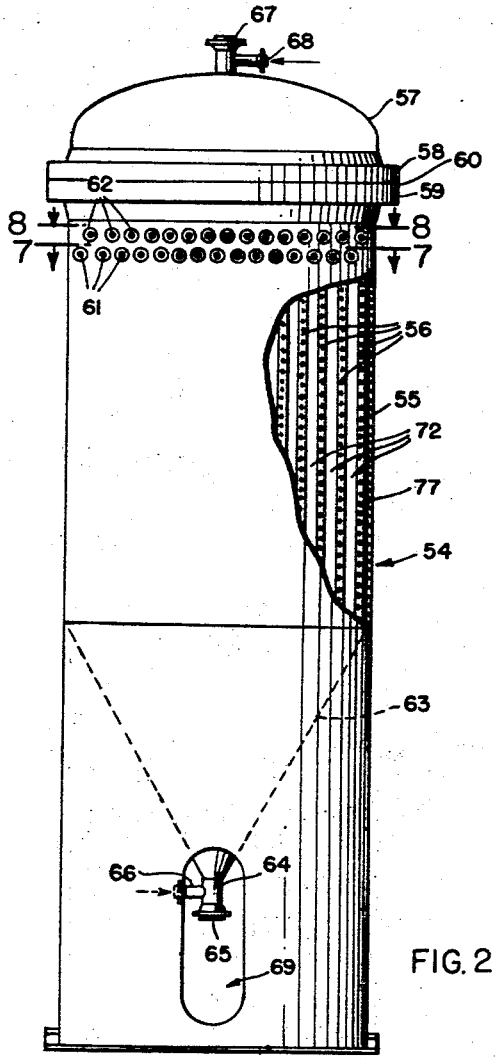
FIG. 2 is an elevational view with parts broken away of one type of cell provided in accordance with the invention.

A preferred type of cell structure is illustrated in FIG. 2 wherein a cell generally indicated at 54 is shown which corresponds in structure to each of the cells 1 to 10 in FIG. 1. The cell 54 consists of an outer housing 55 made of steel or other suitable material of construction and a plurality of cathode units 56 which are disposed inside of the outer housing, mainly in the upper part thereof. In the particular multiple cell construction illustrated in FIG. 2 there are thirty cathode units but it will be understood that the cell structure may contain a greater or smaller number of such units. The top 57 of the cell housing is connected to the lower part of the housing by means of suitable flanges 58 and 59 formed on the parts 57 and 55, respectively. These flanges are sealed by means of a gasket 60 constructed of rubber or other suitable manner so that the top part 57 can be removed, if desired. The housing 55 is pierced by a number of openings carrying pipes 61 in a lower layer and pipes 62 in an upper layer. These pipes constitute inlet pipes for a heat exchange fluid to each of the cathode units 56 and corresponding outlet pipes are provided on the opposite side of the housing. Thus, in cell 1 the inlet pipe 29 would correspond to the first inlet pipe 61 in FIG. 2 and an outlet pipe on the opposite side of the cell in FIG. 2 would correspond to outlet pipe 31 in FIG. 1.

In the lower part of the cell a funnel shaped structure 63 is provided which connects to an outlet 64 provided with two passageways 65 and 66. Both passageways 65 and 66 are controlled by suitable valves, not shown. The passageway 65 permits the removal of the solid reactant substance from the interior of the cell, if desired. Passageway 66 is connected to a conduit for introducing the electrolyte and corresponds, for example, to conduit 11 in cell 1.

Centrally located on the top of the cell are a passageway 67 and a passageway 68. The electrolyte which is introduced through passageway 66 circulates upwardly through the cell and out through passageway 68 into a conduit corresponding, for example, to the conduit 12 in FIG. 1. Lead pellets or other solid reactant are introduced into the cell through the passageway 67 which corresponds to the passageway 49 in FIG. 1. An opening 69 is provided in the lower part of the housing to permit access to the passageways 65 and 66.

Figure 3:
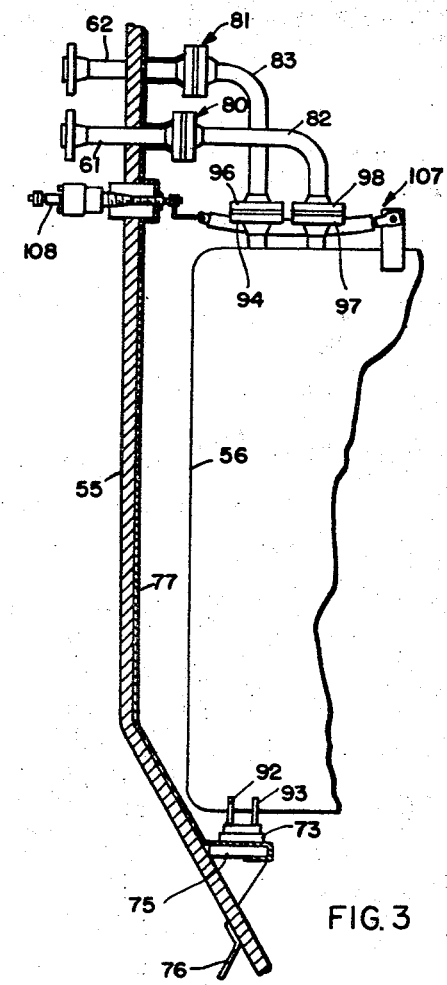
FIG. 3 is an enlarged view of a part of the cell shown in FIG. 2 illustrating the manner in which individual cathode units are mounted within the cell.

In the enlarged view shown in FIG. 3 the method of mounting the cathode unit 56 within the cell and the conduit connections are shown. Reference is also made to FIGS. 7 to 11. FIG. 7 shows how the inlet heat exchange pipes 61 enter one side of the cell housing and how the outlet heat exchange pipes 70 are arranged in the opposite side. FIG. 8 shows how the upper row of heat exchange pipes 62 enter one side of the cell housing and how the outlet heat exchange pipes 71 are arranged in the opposite side of the housing.

As shown by FIGS. 9, 10 and 11, each cathode unit 56 is substantially rectangular in elevation and provides a hollow space which is relatively long and narrow, both horizontally and vertically. As will be seen in FIG. 2, the cathode units 56 are so arranged within the cell as to provide a space 72 between each adjacent pair of units. The space 72 in the operation of the cell is filled with the solid electrically conducting reactant, such as lead pellets, introduced through the passageway 67. The cell structure is preferably such that the funnel shaped member 63 is filled with lead pellets. The electrolyte which enters through passageway 66 passes upwardly through the lead pellets contained in the funnel shaped structure 63 and in the passageways 72 between the cathode units 56 and then passes through the passageway 68 where it is processed as previously described in connection with the flow diagram given in FIG. 1.

The cathode units 56 are constructed at least on the sides thereof which are adjacent to space 72 with an electrically conducting metal such as steel.

Each cathode unit 56 is mounted at the bottom on a pair of supports 73 and 74 which in turn are mounted on a shelf 75 extending around the funnel shaped part 63 of the cell. The shelf 75 consists of steel or other heavy sheet metal which is preferably held in place by being welded to the housing 55. A copper bus bar strap 76 is electrically connected around the periphery of the funnel shaped member 63 as shown in FIG. 3 and electrical current is supplied to the bus bar strap from any suitable source in order to establish a positive potential on the housing 55 which is imparted to the electrically conducting solid reactant substances (e.g., lead pellets) which are in contact with the housing. The cathode units 56 are insulated from the housing by means of an electrically non-conducting lining 77 which is disposed on the inner walls of the housing 55 and beneath the support 73 and 74 in such a way as to provide electrical insulation so that an electrical current introduced through the bus bar strap 76 cannot pass directly to the cathode units 56 but can only pass through the electrolyte which is brought into contact with such units.

Figures 4, 5:
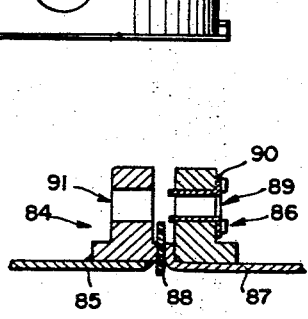
FIG. 4 is an enlarged view of a part of the mounting means for individual cathode units shown in FIG. 3.
FIG. 5 is a partial profile or end view showing the mounting means illustrated in FIG. 4.

In the cathode feed supports as shown in FIGS. 4 and 5, the insulation material 77 is preferably made from Micarta which consists of fabric or paper impregnated with phenol-formaldehyde resins and compressed under heat into a permanently solid substance with high structural and di-electrical properties. The support 73 is preferably fastened by means of machine bolts 78 and 79 to the supporting platform 75 (FIG. 3).

Figure 6:
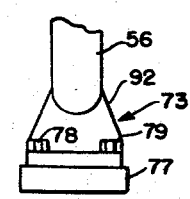
FIG. 6 is a detailed view of the electrical insulation for flanges used in connecting pipes to the cathode unit shown in FIG. 3.

It will be seen from FIG. 3 that the insulation 77 extends around the pipes 61 and 62 where they enter the housing 55 and a special type of flange generally shown at 80 and 81 is provided to connect the pipes 61 and 62 to the pipes 82 and 83, respectively, in such a way that the electrical current from the housing 55 is insulated from the cathode unit 66. A suitable flange structure for this apparatus is shown in FIG. 6 wherein one flange 84 which is welded on the end of a pipe 85 is electrically insulated from the second flange 86 welded on a pipe 87 by means of a gasket 88 made of Teflon (polymerized tetrafluoroethylene) or other suitable material, and one of the bolt openings 89 is provided with a Micarta bushing 90 whereby when a bolt or other fastening means is inserted through the openings 89 and 91 one flange will be electrically insulated from the adjacent flange. This type of structure is used in making the flange structures 80 and 81 and in making all other flange structures for electrically conducting pipes which are used to carry the heat exchange fluid into and out of the cathode units 56. Each of the supports 73 and 74 for each of the cathode units 56 has a pair of bracket members 92 and 93 which fit around the bottom of each cathode unit 56 and are preferably welded thereto. Thus, it will be seen that each of the cathode units 56 is supported at the bottom by special mounting devices which in turn are supported by the outer shell or housing of the cell and which are insulated from the housing or shell.

The upper part of each cathode unit is connected by means of the flanges 94 and 95 to complemental flanges on the inlet and outlet pipes for the heat exchange fluids, respectively. Thus, the flange 94 is connected to flange 96 by means of bolts or machine screws which in turn is welded to the inlet pipe 83. Similarly, the flange 97 is connected to a flange 98 of pipe 82 in an adjacent cathode unit. As will be seen from FIGS. 7 and 8 the cathode units vary in size depending upon their positions in the housing being large at the center of the housing and becoming progressively smaller as they approach the outside of the housing.

Each cathode unit preferably contains interior passageways 99 as shown by the broken away part of FIG. 9 which are formed by a series of baffles 100. The baffles 100 are arranged in such a way that the heat exchange fluid follows an up and down path through the cathode unit as shown by the arrows in FIG. 9. The sides of the cathode unit are held in position by the members 101 which may be, for example, steel bars welded to the sides of the cathode unit at 102 and 103 as shown in FIG. 12.

It is important for the purpose of the invention that each of the cathode units where it would normally be in contact with the electrically conducting reactant substance (e.g., lead pellets) be insulated therefrom by suitable insulation means which will prevent direct contact but at the same time permit the liquid reaction mixture or electrolyte to contact the outer part of the cathode unit. This insulation is preferably effected by employing three liquid permeable insulating layers as shown in FIG. 12, said layers consisting of a woven glass filament screen or cloth 104, a nylon cloth 105 and a second woven glass screen or cloth 106. These layers surround each of the cathode units 56 in such a way that the lead pellets or other such reactant substances cannot come in direct contact with the cathode units. Without this insulation a short circuit would occur which would impair the operating efficiency of the cell.

Each of the cathode units 56 is connected to a negative source of electricity by suitable connections generally illustrated at 107 in FIG. 3. In the embodiment shown in the drawings it is preferable to have two such connections for each cathode unit adjacent opposite sides thereof except the two smallest units where a single connection will suffice. All connections are insulated throughout from the terminal 108 to the point where the connection 107 is made with each cathode unit.

The cathode units are also spaced at the top in any suitable manner, for example, as shown in FIGS. 13 and 14, which illustrate the top linkage supports for the cathode units. This type linkage supports generally shown at 109 in FIGS. 13 and 14 consist of clips 110 which are mounted on shafts 111. Also mounted on said shafts are linkages 112 made of Micarta or other suitable electrically non-conducting material. As shown by FIGS. 9 and 10 there are preferably two sets of linkages adjacent each side of the top of each cathode unit.

A typical operation of the cell may be described as follows. Lead pellets are introduced into the cell through the passageway 67 and fill the spaces 72 between each of the thirty cathode units 56. These pellets also fill the funnel shaped member 63. The cooling fluid is circulated through each of the cathode units 56 in the manner previously described. The terminal 108 is connected to a negative source of electricity and the bus bar 76 is connected to a positive source of electricity. An electrolyte consisting of ethylmagnesium chloride dissolved in an anhydrous solvent, such as, for example, the dibutylether of diethylene glycol, is introduced into the cell through the inlet 66 and circulated upwardly through the lead pellets and outwardly through the outlet 68. This circulation is continuous and the electrolyte is recirculated in the manner described with respect to FIG. 1. A typical temperature of operation is 100° F. In a cell in which the cathode area and the anode area are each one square foot, a typical average direct current voltage is 27.4 volts and a typical average current is 14.8 amperes. The electrolyte preferably contains an excess of ethyl chloride over that required to form the ethylmagnesium chloride ($C_2H_5MgCl$). The desired temperature is maintained by controlling the temperature of the heat exchange fluid. The current which flows through the lead anodes causes them to be positively charged with respect to the cathode units. The lead pellets are out of direct contact with the cathode units by virtue of the electrical insulation around each of these units. However, this electrical insulation is permeable to the electrolyte so that the electrolyte can flow in contact with the walls of the cathode units which have a negative potential. As the reaction proceeds, the lead pellets are dissolved by the electrochemical action and react with free hydrocarbon radicals which are liberated from the ethylmagnesium chloride forming tetraethyl lead. After a period of time the electrolyte, if allowed to stand, tends to stratify into a lower layer which is rich in tetraethyl lead and an upper layer which contains mainly ethylmagnesium chloride and the solvent. At any time in the process, preferably after a relatively high concentration of tetraethyl lead has been obtained, a portion of the electrolyte is removed either continuously or intermittently to a recovery system where the tetraethyl lead is separated by vacuum distillation, steam distillation, or other suitable method, and the unreacted solvent and Grignard reagent are returned to the process. Alternatively, the cell can be operated continuously until the optimum amount of tetraethyl lead is formed at which time all of the electrolyte is removed from the system and the tetraethyl lead is recovered therefrom. By providing a plurality of cells in series it is possible to increase the production of tetraethyl lead without utilizing very much space. In a similar manner, the cell can be employed for making tetramethyl lead, in which case, however, the reaction liquid would contain methyl magnesium chloride dissolved in an anhydrous solvent. The process can also be used for making other organic lead compounds and compounds of other metals besides lead, including, for example, compounds of zinc and manganese.

The flow rate of the electrolyte is subject to variation and a typical flow rate may be, for example, 1.5 gallons per minute. The pressure inside of the cell is normally superatmospheric and while it is subject to variation, a typical pressure is around 7.5 pounds per square inch gauge (p.s.i.g.). A nitrogen purge is preferably used when the cell is loaded with the electrically conducting reactant substance. In making compounds such as organic lead compounds it is always essential to take precautions to prevent any escape of vapors from the cell into the atmosphere. Each cell is closed and sealed against the escape of vapors.

In the foregoing discussion where "average direct current voltage" is mentioned it will be understood that this refers to an average of the voltage over an entire run. Similarly, "average current" in terms of amperes refers to the average amperage over an entire run. In a typical run of about 23 hours the voltage does not vary greatly and a starting voltage, for example, would be 28 volts, a final voltage 27.9 volts and a minimum voltage 27.1 volts. On the other hand, the amperage decreases as the conductance decreases. A starting amperage, for example, would be 25.0 amperes and this would decrease over a 23 hour run to 5.7 amperes. The current density in such a run would be around 16 to 18 amperes per square foot.

In the practice of the invention a preferred embodiment is to employ, instead of the three layers of cloth 104, 105 and 106, one or more layers of a cloth woven from polypropylene filaments or a cloth woven from both polypropylene filaments and polyethylene filaments (for example, a cloth containing 70% polypropylene filaments and 30% polyethylene filaments). The openings between the filaments, as previously indicated, should be sufficiently small to prevent the lead pellets or other reactant substance from passing therethrough and contacting the cathode. Cloth corresponding to 50 to 100 mesh (U.S. sieve series) is normally satisfactory. A preferred structure of the insulating layer is one in which two pieces of cloth (preferably a polypropylene or polypropylene mixed with polyethylene filaments) are united in such a way that one piece of cloth is corrugated and the other is flat, thereby providing a single faced corrugated structure. Either the flat surface or the corrugated surface may be placed against the cathode wall, thereby spacing the cathode wall from the reactant substance by a predetermined distance and permitting the electrolyte to flow through the intervening space.

The invention is hereby claimed as follows:

A cell for carrying out electrochemical reactions comprising a generally cylindrical container which is electrically conducting and adapted to hold a body of reaction liquid, said container being provided with a top and being sealed from the atmosphere, the lower part of said container being generally conical in shape and having a passageway at the apex thereof, the top of said container having a passageway therein, a plurality of cathode units mounted in the main cylindrical body portion of said container in spaced relationship to each other and to the walls of said container, heat exchange means for controlling the temperature of said cathode units, electrical insulating means on the interior surface of said container, electrical insulating means chemically inert to the reactants and products of reaction in contact with surfaces of each of said cathode units permitting the flow of an electrolyte to said surfaces, said electrical insulating means on the surfaces of each of said cathode units being spaced to form anode passagesways in communication with said passageway at the top of said container, metal anode particles in said anode passageways, means to introduce metal anode particles through said passageway in the top of said container whereby the anode passageways and the conical section at the bottom of said container are filled with said metal particles, means to circulate an electrolyte through said passageways in the top and bottom of said container and through said metal anode particles, means connecting a negative source of electricity directly to said cathode units, means electrically insulating each of said cathode units from said container, and means connecting a positive source of electricity to said container.

References Cited by the Examiner
UNITED STATES PATENTS

| | | | |
|---|---|---|---|
| 563,972 | 7/96 | Kroseberg et al. | 204—262 |
| 2,568,844 | 9/51 | Benning et al. | 204—262 |
| 2,868,711 | 1/59 | Karr | 204—274 |
| 2,920,028 | 1/60 | Forbes | 204—274 |
| 3,065,163 | 11/62 | Hornsberg | 204—220 |

FOREIGN PATENTS

| | | |
|---|---|---|
| 600,331 | 2/26 | France. |
| 1,233,460 | 10/60 | France. |
| 779,928 | 7/57 | Great Britain. |
| 173,725 | 3/35 | Switzerland. |

JOHN H. MACK, *Primary Examiner.*

JOSEPH REBOLD, JOHN R. SPECK, *Examiners.*